United States Patent [19]
Kojima et al.

[11] Patent Number: 5,507,005
[45] Date of Patent: Apr. 9, 1996

[54] DATA TRANSFERRING SYSTEM BETWEEN HOST AND I/O USING A MAIN BUFFER WITH SUB-BUFFERS WHERE QUANTITY OF DATA IN SUB-BUFFERS DETERMINE ACCESS REQUESTS

[75] Inventors: Akira Kojima; Tsuneo Hirose; Norikazu Takayama; Mitsuru Kubo, all of Odawara; Atsushi Takayasu, Hiratsuka, all of Japan

[73] Assignee: Hitachi, Ltd., Tokyo, Japan

[21] Appl. No.: 852,563

[22] Filed: Mar. 17, 1992

[30] Foreign Application Priority Data

Mar. 18, 1991 [JP] Japan ..................................... 3-052487

[51] Int. Cl.6 ................................................... G06F 12/00
[52] U.S. Cl. ........................... 395/872; 395/478; 395/433; 364/239; 364/239.6; 364/239.8; 364/DIG. 1
[58] Field of Search ................................ 395/275, 425, 395/250, 432, 433, 478, 872, 876

[56] References Cited

U.S. PATENT DOCUMENTS

| | | | |
|---|---|---|---|
| 4,754,399 | 6/1988 | Yamamoto et al. | 395/425 |
| 5,008,808 | 4/1991 | Fries et al. | 395/250 |
| 5,072,420 | 12/1991 | Conley et al. | 395/425 |
| 5,075,805 | 12/1991 | Peddle et al. | 360/61 |
| 5,317,713 | 5/1994 | Glassburn | 395/425 |

FOREIGN PATENT DOCUMENTS 2-5286  1/1990  Japan .

*Primary Examiner*—Thomas C. Lee
*Assistant Examiner*—Sang Hui Kim
*Attorney, Agent, or Firm*—Kenyon & Kenyon

[57] ABSTRACT

A data transfer control apparatus for communicating data between a host device and an input/output device through a main buffer memory for temporarily holding the data, wherein a sub-buffer memory is disposed at least either between the main buffer memory and the host device or between the main buffer memory and the input/output device for temporarily storing the data, the amount of data stored in the sub-buffer memory is detected, access requests to the main buffer memory on the side of the host device or the input/output device are outputted in accordance with the detected data amount, and one of the access requests to the main buffer memory is selected in accordance with the priority order to access the main buffer memory on the basis of the selected access request.

13 Claims, 9 Drawing Sheets

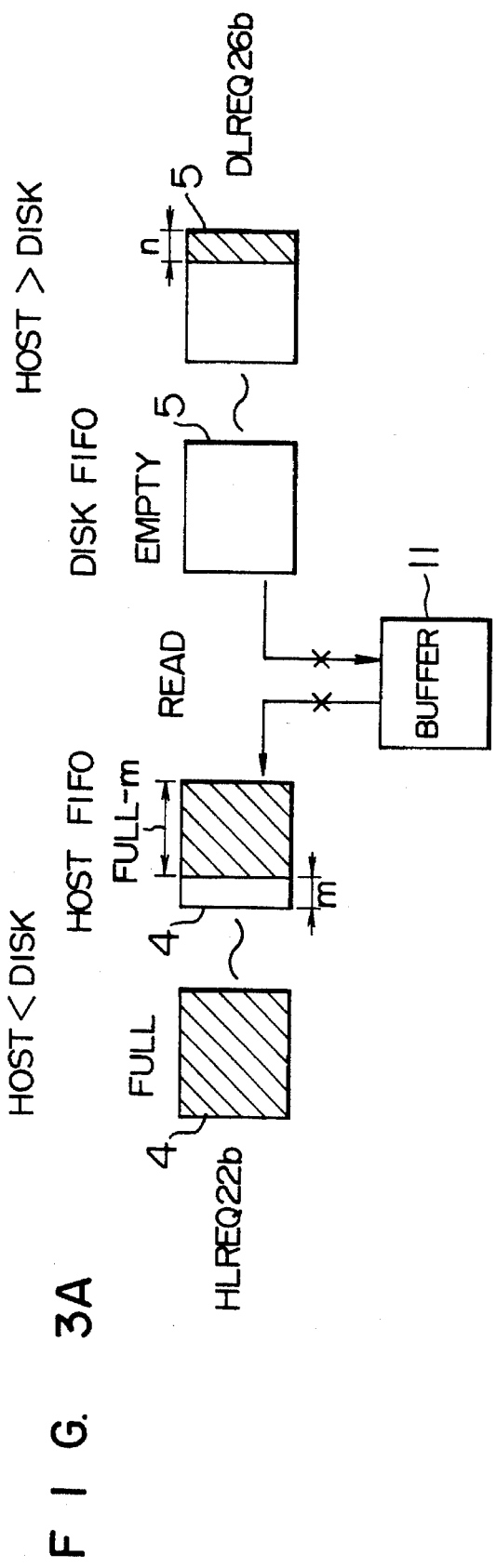
F I G. 3A
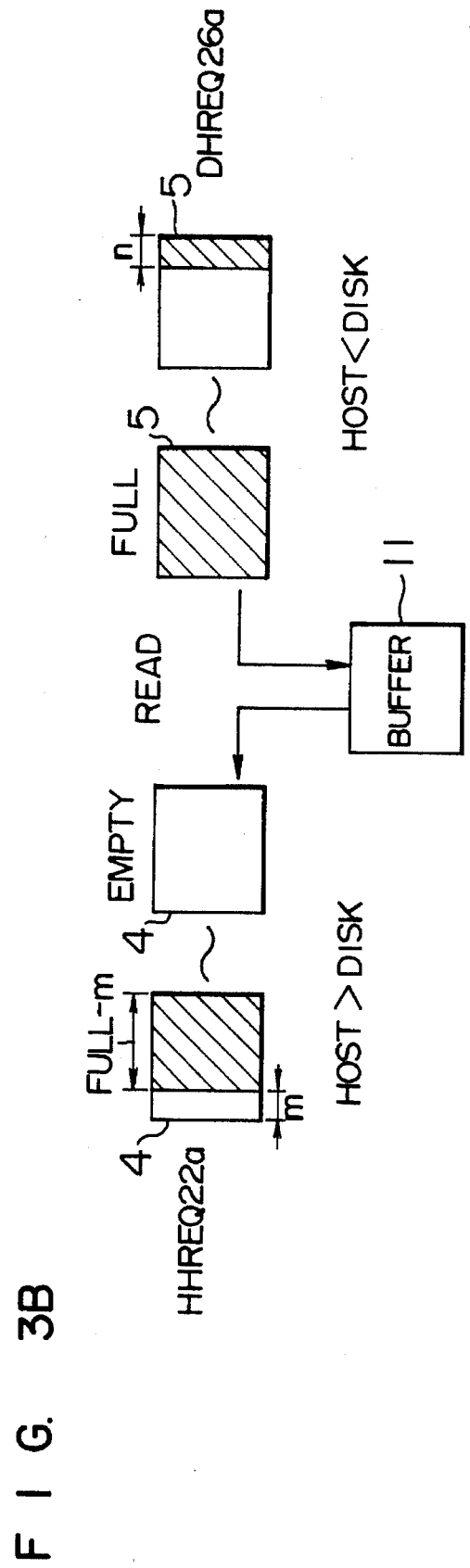
F I G. 3B

F I G. 5
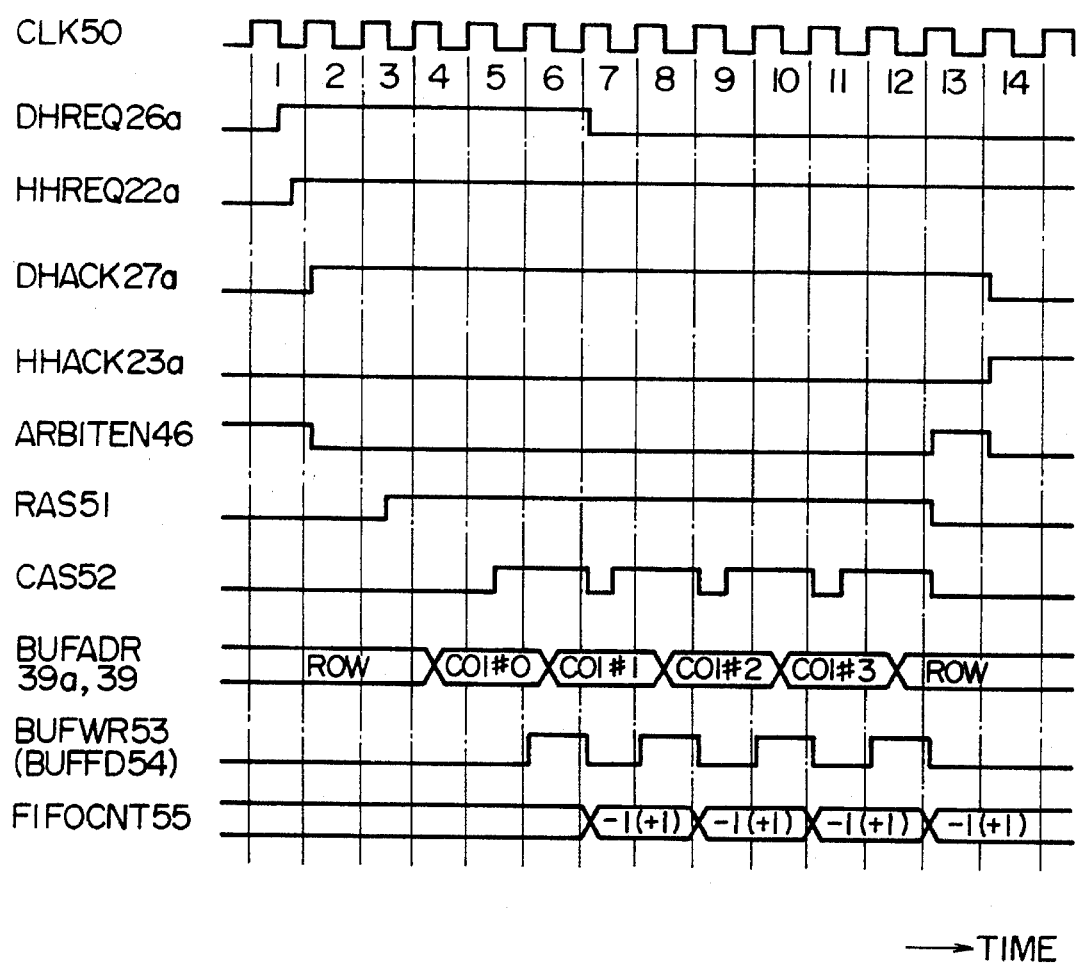

FIG. 8

| BUFF ADR 0-9 | DMA ADR 0-19 | | | | | | | |
|---|---|---|---|---|---|---|---|---|
| | COLUMN ADR | | | | ROW ADR | | | |
| 0 | 0 | | | | 4 | | | |
| 1 | 1 | | | | 5 | | | |
| 2 | 2 | 11 | 2 | 11 | 6 | | | |
| 3 | 3 | 12 | 3 | 12 | 7 | | | |
| 4 | 13 | | 18 | | 8 | | | |
| 5 | 14 | | | | 9 | | | |
| 6 | 15 | | | | 10 | | | |
| 7 | 16 | | | | 11 | 2 | 11 | 2 |
| 8 | 17 | | | | 12 | 3 | 12 | 3 |
| 9 | 19 | | | | 13 | | | |
| RAM | 256KB | | 1MB | | 256KB | | 1MB | |
| PAGE | 16P | 4P | 16P | 4P | 16P | 4P | 16P | 4P |

DATA TRANSFERRING SYSTEM BETWEEN HOST AND I/O USING A MAIN BUFFER WITH SUB-BUFFERS WHERE QUANTITY OF DATA IN SUB-BUFFERS DETERMINE ACCESS REQUESTS

BACKGROUND OF THE INVENTION

The present invention relates to a data transfer control method and apparatus, and more particularly, to a data transfer control method and apparatus which enables a high speed data transfer between units through a buffer memory constituted of cheap and large capacity dynamic random access memories (DRAM) or the like.

In external storages for a computer system, for example, a magnetic disk drive unit, for the purpose of matching the data transfer between a host or initiator device (e.g. a host computer) having, for example, a large data transfer capacity and a peripheral device or target device with a relatively slow data transfer speed due to a rotational delay, improving the data transfer efficiency therebetween, and so on, it is known that a buffer memory constituted of semiconductor memory elements such as DRAM is provided in part of a magnetic disk drive control unit disposed between a magnetic disk drive unit and a host.

On the other hand, a conventional access priority arbitration technique is disclosed, for example, in JP-A-2-5286. This conventional technique is known as a method of improving the data transfer efficiency achieved by reducing a read/write cycle time of DRAM using a page mode, and switching the priority order of competing read and write with a refresh cycle to match the frequencies of read and write processings.

A refresh request for DRAMs has been generally processed with the first priority for ensuring the data fidelity, as described in the above-mentioned document.

SUMMARY OF THE INVENTION

In the foregoing conventional method, even if either of a host which accesses the DRAMs or a peripheral device has a data transfer speed several times higher than the other, equal priority is given to both devices, so that the processing efficiency is not sufficiently improved. Also, the access priority to the DRAM must be switched for every refresh cycle, which results in a substantially degraded data transfer efficiency by the refresh processing.

It is an object of the present invention to provide a data transfer control method and apparatus which eliminates the above-mentioned defects inherent to the prior art technique.

It is another object of the present invention to provide a data transfer control method and apparatus which is capable of improving the efficiency of data transfer between a host and a peripheral device through a buffer memory disposed therebetween without being influenced by the difference in data transfer speed between the host and the peripheral device.

It is a further object of the present invention to provide a data transfer control method and apparatus which is capable of realizing employment of a buffer memory constituted of cheap elements as well as increase in data capacity and improvement in data transfer efficiency.

To achieve the above objects, according to one aspect of the present invention, a data transfer control apparatus for communicating data between a host device and an input/output device through a main buffer memory for temporarily holding the data includes: a sub-buffer memory disposed at least either between the main buffer memory and the host device or between the main buffer memory and the input/output device for temporarily storing the data; an access request output unit for detecting the amount of data stored in the sub-buffer memory and for outputting access requests to the main buffer memory on the side of the host device or the input/output device in accordance with the detected amount of data; and arbitration unit for selecting one of the access requests to the main buffer memory in accordance with the priority order to access the main buffer memory on the basis of the selected access request.

According to another aspect of the present invention, a data transfer control method for communicating data between a host device and an input/output device through a main buffer memory for temporarily holding the data includes the steps of: temporarily holding the data in a sub-buffer memory disposed at least either between the main buffer memory and the host device or between the main buffer memory and the input/output device; the step of detecting the amount of data stored in the sub-buffer memory; the step of outputting access requests to the main buffer memory on the side of the host device or the input/output device in accordance with the detected data amount; and the step of selecting one of the access requests to the main buffer memory in accordance with the priority order to access the main buffer memory on the basis of the selected access request.

In an example of the present invention, the access request output unit outputs a first access request for transferring data from the sub-buffer memory to the main buffer memory when the amount of data in the sub-buffer memory is equal to or larger than a data amount which is read from the sub-buffer memory during a single data transfer, outputs a second access request for transferring data from the sub-buffer memory to the main buffer memory when the amount of data in the sub-buffer memory is less than the data amount which is read from the sub-buffer memory during a single data transfer, and sets priority of the first access request higher than priority of the second access request.

Further in an example of the present invention, the access request output unit outputs a third access request for transferring data from the main buffer memory to the sub-buffer memory when an empty area in the sub-buffer memory is equal to or larger than a data amount which is read into the sub-buffer memory during a single data transfer, outputs a fourth access request for transferring data from the main buffer memory to the sub-buffer memory when an empty area in the sub-buffer memory is less than the data amount which is read into the sub-buffer memory during a single data transfer, and sets priority of the third access request higher than priority of the fourth access request.

Specifically, the data transfer control method and apparatus of the present invention provides a sub-buffer constituted of a FIFO memory in at least either an interface between a main buffer memory and a host device or an interface between the main buffer memory and a peripheral device, classifies priorities of respective data transfer requests between the host device and the main buffer memory and between the peripheral device and the main buffer memory in accordance with states of the sub-buffer (i.e., full, empty, or margin available), and dynamically gives a right of access to the main buffer memory preferentially to a processing with a higher priority in consideration of transfer conditions of the host or peripheral device.

Further, in an example of the present invention, a unit is provided for providing a refresh request for refreshing the main buffer memory to the arbitration unit at predetermined intervals. When an access request exists for transferring equal to or larger than a predetermined amount of data at a timing prior to a refresh request provided by the unit for providing a refresh request, the arbitration unit, in response to the access request in place of the refresh request, accesses the main buffer memory to refresh the main buffer memory.

Specifically, the inventors paid attention to the fact that a read or write processing of a peripheral storage such as a magnetic disk drive unit is performed with at least one sector (generally 512 bytes) portion of data at a constant speed corresponding to a normal rotation of the magnetic disk drive unit. In consideration of addresses of a main buffer memory to be accessed, DRAMs constituting the main buffer memory can be refreshed by using data actually transferred between a host device and a peripheral storage during a read or write operation therebetween, and the refresh counter is therefore reset, while requests having higher priority during the above processing are assumed to have priority over the refresh request.

According to the above described data transfer control method and apparatus of the present invention, if a host device has a transfer speed several times faster than that of a peripheral device such as a magnetic disk drive unit, data in a host side prefetching buffer (host side FIFO memory) and a peripheral side prefetching buffer (peripheral side FIFO memory) are read out faster in a read processing for reading data from a magnetic disk, which results in both buffers being operating in an empty state.

In a write processing for writing data on a magnetic disk, data is written from the peripheral side prefetching buffer to the disk at a lower speed, which results in both buffers being operating in a full state.

On the contrary, if a data transfer speed of a peripheral storage is several times higher than that of a host device, the prefetching buffers operates in a full state during a read and in an empty state during a write.

In this event, the priority order of the main buffer memory during a read is determined, for example, in the order of:

(1) a margin available in the peripheral side FIFO memory;

(2) a margin available in the host side FIFO memory;

(3) the peripheral side FIFO memory being empty; and (4) the host side FIFO memory being full.

Also, the priority order of the main buffer memory during a write is determined, for example, in the order of:

(1) a margin available in the peripheral side FIFO memory;

(2) a margin available in the host side FIFO memory;

(3) the peripheral side FIFO memory being full; and (4) the host side FIFO memory being empty.

Thus, it is possible to dynamically make the switch based on the entire data flow so as to give a right of access to the main buffer memory to processings in the order of higher priorities. As a result, the efficiency of data transfer between the host device and the peripheral device such as a magnetic disk drive unit through the main buffer memory can be improved without being influenced by the difference in data transfer speed between the host and peripheral devices.

Generally speaking, when a magnetic disk or a recording medium is accessed in a magnetic disk drive unit, at least one sector is sequentially processed so that a data transfer speed, in the meantime, is determined to be a constant burst speed corresponding to a rotational speed of the magnetic disk drive unit.

Giving as an example a magnetic disk drive manufactured by the assignee of the present application, one sector or 512 bytes of data are transferred at a speed of 3 Mbytes/second, and therefore, addresses of nine bits are accessed in 170 µs.

However, since a look ahead cache actually operates even if the access is a single command for accessing a sector and a relatively long time period intervenes until the next command is executed, one segment portion of a buffer area (48 Kbytes $\geq$ 15 bits in the case of the foregoing magnetic disk drive unit) is accessed.

Actually, since overhead of several milliseconds of the magnetic disk drive unit or the host computer occurs each time a command is executed, even if accesses of a minimum data length are repeated at minimum intervals in a magnetic disk drive unit which is not provided with the look ahead cache, DRAMs constituting a main buffer memory can be refreshed by using actually transferred data during the overhead period.

BRIEF DESCRIPTION OF THE DRAWINGS

FIGS. 3A and 3B are diagrams illustrating examples of the relationship between states of a FIFO memory and buffer access priority during a disk read in the data transfer control method according to one embodiment of the present invention;

FIG. 5 is a timing chart illustrating an example of the operation of the data transfer control method according to one embodiment of the present invention;

FIG. 8 is a table illustrating an example of the structure of a buffer memory for the data transfer control method according to one embodiment of the present invention.

DESCRIPTION OF THE PREFERRED EMBODIMENT

Data transfer control method and apparatus according to one embodiment of the present invention will hereinbelow be described with reference to FIGS. 1 to 9.

Figure 1:
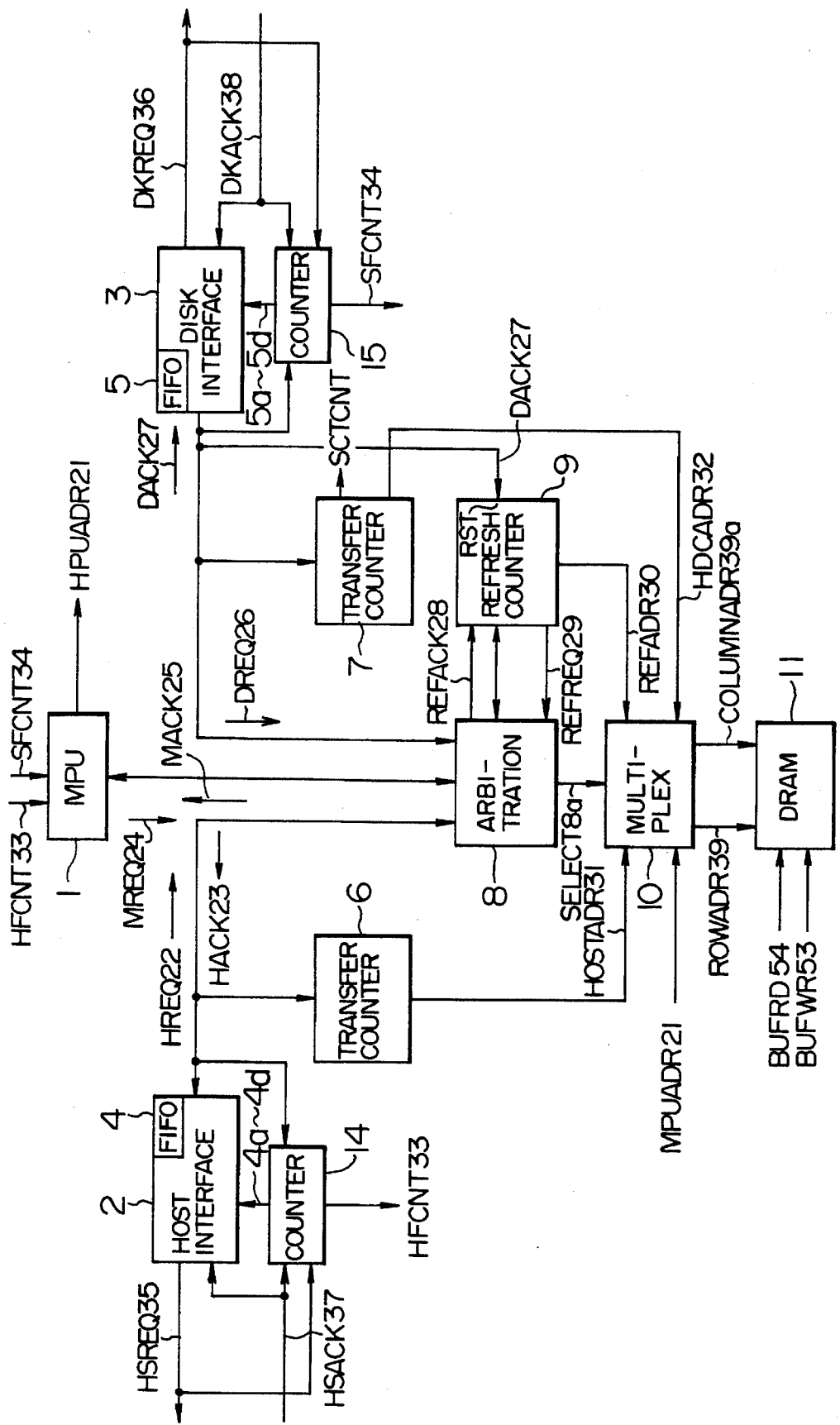
FIG. 1 is a block diagram illustrating the configuration of a magnetic disk drive control unit embodying a data transfer control method according to one embodiment of the present invention.

FIG. 1 is a block diagram illustrating an example of the configuration of a data transfer control apparatus of the embodiment, where a concept of the present invention is implemented in a magnetic disk drive control unit by way of example.

Referring to FIG. 1, the magnetic disk drive control unit of the present embodiment comprises a microprocessor (MPU) 1 for controlling the whole unit; a host interface control circuit 2 for communicating information with a host computer (HOST), not shown; a disk drive interface control circuit 3 for communicating information with a peripheral device (or an input/output), for example, a magnetic disk drive unit (hereinbelow simply called the drive), not shown; and a buffer memory 11 (e.g. constituted of DRAMs) for temporarily storing data which is communicated between the disk drive interface control circuit 3 and the host interface control circuit 2.

Accesses to the buffer memory 11 from the host interface control circuit 2 and the disk drive interface control circuit 3 are controlled by a buffer access arbitration circuit 8 (i.e., means for arbitrating accesses to a buffer), such that an acknowledged access is executed to a designated address in the buffer memory through an address selection circuit (e.g., a multiplexer) 10.

The amounts of data communicated between the host interface control circuit 2 and the buffer memory 11 and between the disk drive interface control circuit 3 and the buffer memory 11 are counted by transfer counters 6 and 7, respectively.

In this embodiment, the buffer memory 11 is constituted of DRAM elements which are refreshed on the basis of a counted value set in a refresh counter 9. The buffer access arbitration circuit 8 manages whether or not a refresh is executed and a timing of the refresh.

In this embodiment, memories, e.g., a FIFO (first-in first-out) memory 4 (front stage buffer or sub buffer) and a FIFO memory 5 (front stage buffer or sub buffer), both having, for example, a capacity lower than the buffer memory 11, are disposed between the host interface control circuit 2 and the buffer memory 11 and between the disk drive interface control circuit 3 and the buffer memory 11, respectively.

The amounts of data stored in the respective FIFO memories 4 and 5 are counted by a host FIFO counter 14 and a disk FIFO counter 15, respectively, which output signals HFCNT 33 and SFCNT 34 indicative of the respective data amounts which are preferably supplied to the MPU 1.

Data communications between a host computer, not shown, and the buffer memory 11 are performed by the host interface control circuit 2. When the FIFO buffers 4 and 5 are in a data transfer enabled state (e.g., states shown in FIGS. 3B and 4B), the control circuit 2 outputs a transfer request signal HSREQ 35 to a host controller, not shown, as will be later described. When the host controller acknowledges a transfer, a transfer acknowledge signal HSACK 37 is returned from the host controller to the control circuit 2. Then, in synchronism with the signals HSACK 37 and HSREQ 35, data may be communicated between the host computer and the buffer memory 11 through the FIFO memory 4.

A byte address at this data transfer is counted by a transfer counter which counts responsive to a buffer access request signal HREQ 22 or an acknowledge signal HACK 23, the counted value of which is supplied to an address selection circuit 10 as a byte address of the buffer memory. The amount of data communicated between the control circuit 2 and the buffer memory is thus counted by the data amount counter 6.

The number of bytes stored in the FIFO memory 4 at this time is preferably informed to MPU 1 by an output signal HFCNT 33 of a FIFO counter 14.

On the other hand, data communications between an interface controller, not shown, on the side of a peripheral drive, not shown, and the buffer memory 11 is performed by the disk interface control circuit 3. As will be later described, when the FIFO buffers 4, 5 are in a transfer enabled state, the control circuit 3 outputs a transfer request signal DKREQ 36 to a disk controller, not shown. When the disk controller, not shown, acknowledges a transfer, a transfer acknowledge signal DKACK 38 is returned to the control circuit 3, and thereafter a data communication is performed between the host computer and the drive through the FIFO memory 5 in synchronism with the signal DKACK 38 or DKREQ 36.

The number of bytes stored in the FIFO memory 5 in this event is preferably informed to MPU 1 by an output signal SFCNT 34 of a counter 15.

A byte address at this data transfer is counted by a transfer counter 7 which counts in response to a buffer access request signal DREQ 26 or an acknowledge signal DACK 27, the counted value of which is supplied to the selection circuit 10 as a byte address HDCADR 32 of the buffer memory.

The buffer access arbitration circuit 8 arbitrates requested accesses among the buffer access request HREQ 22 for a transfer to the host computer, the buffer access request DREQ 26 for a transfer to the drive, not shown, the buffer access request MREQ 24 by the microprocessor 1 for controlling the disk controller, and a buffer access request REFREQ 29 by the refresh counter 9 for refreshing the buffer memory (DRAM) 11, and sends acknowledge signals HACK 23, DACK 27, MACK 25 and REFACK 28, respectively, to the selected or acknowledged requests.

Among byte addresses HOSTADR 31, HDCADR 32, MPUADR 21 and REFADR 30 at an access request time, one corresponding to the acknowledge signal outputted by the buffer access arbitration circuit 8 is selected in response to a selection signal SELECT 8a from the buffer access arbitration circuit 8 and selectively supplied to the buffer memory 11.

A selected address from the address selection circuit 10 is supplied to the buffer memory 11 in a two-divided form consisting of a row address ROWADR 39 and a column address COLUMNADR 39a.

The refresh counter 9 is reset by, for example, the acknowledge signal DACK 2 issued to a transfer request from a drive.

Figure 2:
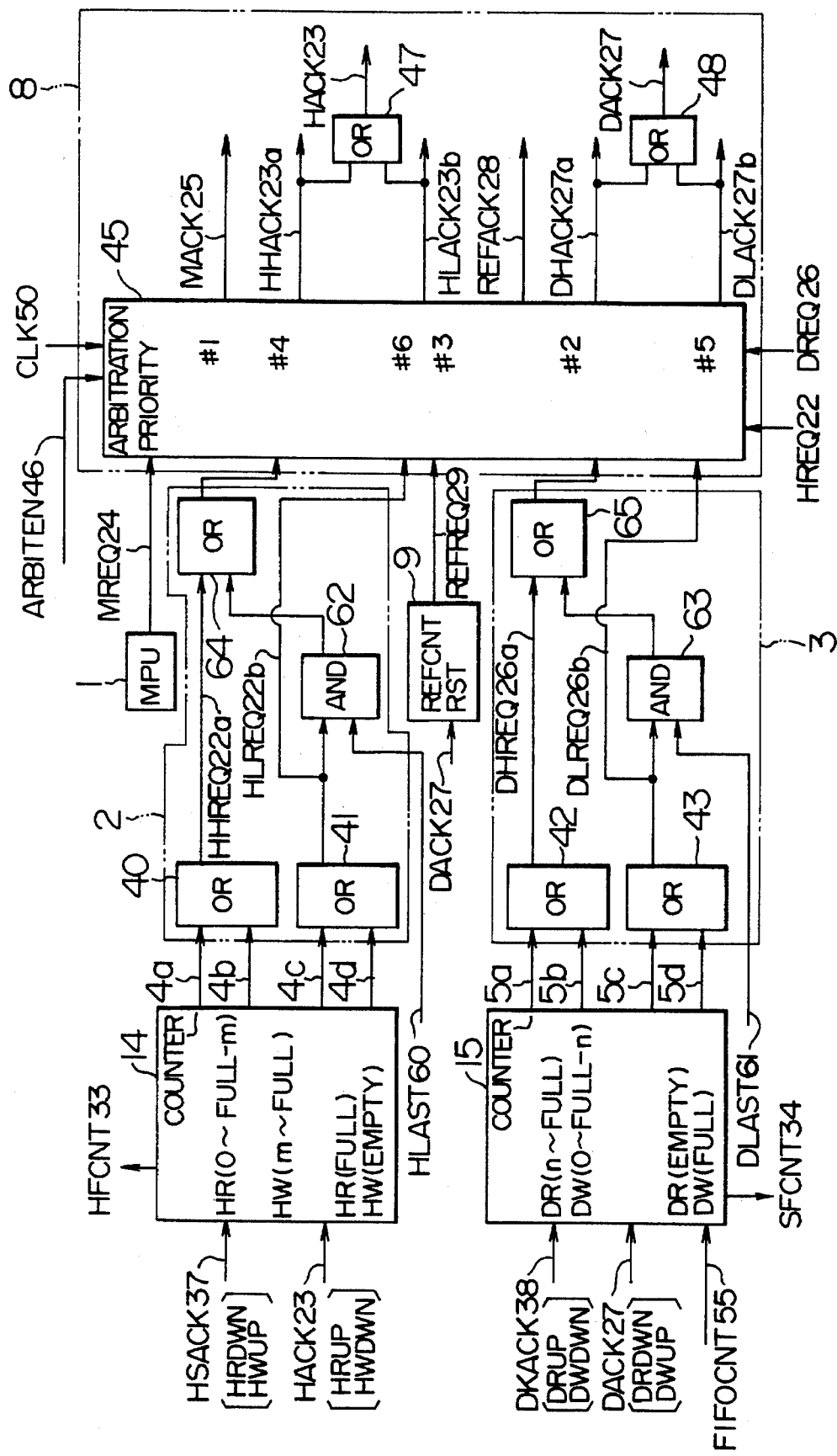
FIG. 2 is a block diagram illustrating an example of a buffer access arbitration circuit employed in the magnetic disk drive control unit shown in FIG. 1.

FIG. 2 illustrates an example of the configuration of the buffer access arbitration circuit 8, the interface control circuits 2, 3 and so on. The buffer access arbitration circuit 8 of this embodiment comprises, for example, an arbitration logic circuit 45 and OR circuits 47, 48 disposed on the output side of the arbitration logic circuit 45. The interface control circuit 2 has OR circuits 40, 41 and 64 and an AND circuit 62, while the interface circuit 3 has OR circuits 42, 43 and 65 and an AND circuit 63.

The FIFO memory counter 14 on the side of the host interface control circuit 2 outputs logic signals 4a, 4b, 4c and 4d to the arbitration logic circuit 45. The logic signals 4a and 4b are converted to a signal HHREQ 22a, later referred to, by the OR circuit, which is inputted to the arbitration logic circuit 45 through the OR circuit 64.

The logic signals 4c and 4d are converted to a signal HLREQ 22b, later referred to, by the OR circuit 41, and part of this HLREQ 22b is logically ANDed with a signal HLAST 60, later referred to, by the AND circuit 62, the result of which is inputted to the OR circuit 64 together with the signal HHREQ 22a.

Likewise, the FIFO memory counter 15 on the side of the disk interface control circuit 3 outputs logic signals 5a, 5b, 5c and 5d to the arbitration logic circuit 45. The logic signals 5a and 5b are converted to a signal DHREQ 26a, later referred to, by the OR circuit 42, which is inputted to the arbitration logic circuit 45 through the OR circuit 65.

The logic signals 5c and 5d are converted to a signal HLREQ 26b, later referred to, by the OR circuit 43, and part of this HLREQ 26b is logically ANDed with a signal DLSAT 61, later referred to, by the AND circuit 63, the result of which is inputted to the OR circuit 65 together with the signal DHREQ 26a.

Next, description will be made as to an example of counting operations of the FIFO memory counter 14 on the side of the host interface control circuit 2 and of the FIFO memory counter 15 on the side of the disk interface control circuit 3. First of all, the counting operation during a disk write will be explained.

The FIFO memory counter 14 will be first described. When data is written from the host computer into the FIFO memory 4, if HSACK 37 is returned from the host computer in response to HSREQ 35, the host interface control circuit 2, in response thereto, supplies HSREQ 35 to the host computer, and responsively, predetermined amount of data is sent together with HSACK 37 and written into the FIFO memory 4. The counter 14 thus may be incremented, for example, by one each time HSREQ 35 or HSACK 37 from the second generation is inputted thereto.

On the other hand, when data is written from the FIFO memory 4 to the buffer memory 11, a predetermined amount of data is supplied to the arbitration logic circuit 45 together with HREQ 22. When HACK 23 is responsively returned from the arbitration logic circuit 45, the predetermined data is written from the FIFO memory 4 to the buffer memory 11. Therefore, the counter 14 may be decremented by one each time HACK 23 is inputted thereto.

Next, the operation of the FIFO memory counter 15 will be described.

For writing data from the buffer memory 11 into the FIFO memory 5, each time the request signal DREQ 26 or the acknowledge signal DACK 27, from the second generation, is inputted, that is, each time the predetermined amount of data is written into the memory 5, the FIFO memory counter 15 may be incremented, for example, by one. Also, for writing data stored in the FIFO memory 5 into a disk, each time the acknowledge signal DKACK 38 is inputted thereto, that is, each time the predetermined amount of data is written from the FIFO memory 5 to the disk, the counter 15 may be decremented, for example, by one.

Next, description will be made as to the counting operation during a disk read. First, the operation of the FIFO memory counter 15 will be explained.

For writing data from a disk to the FIFO memory 5, the counter 15 may be incremented, for example, by one each time the transfer request signal DKREQ 36 or the transfer acknowledge signal DKACK 38 from the second generation is inputted, that is, each time a predetermined amount of data is written into the memory 5, in a manner similar to the operation of the counter 14. Likewise, for writing data from the FIFO memory 5 into the buffer memory 11, the counter 15 may be decremented, for example, by one each time the transfer acknowledge signal DACK 27 is inputted from the arbitration logic circuit 45, that is, a predetermined amount of data is written from the memory 5 into the buffer memory 11.

Next, the operation of the FIFO memory counter 14 will be explained.

For writing data from the buffer memory 11 into the FIFO memory 4, in response to the acknowledge signal HACK 23 sent in response to the request signal HREQ 22 supplied from the host interface circuit 2 to the arbitration logic circuit 45, the host interface circuit 2 again outputs HREQ 22, and a predetermined amount of data is read from the buffer memory 11 together with the signal HACK 23 sent in response thereto and stored in the FIFO memory 4. The counter 14 thus may increment its contents, for example, by one each time the request signal HREQ 22 or the acknowledge signal HACK 23 from the second generation is inputted thereto.

Stated another way, when the host computer reads data stored in the FIFO memory 4, the host controller is supplied with the transfer request signal HSREQ 35 from the host interface control circuit 2 together with a predetermined amount of data. When the transfer acknowledge signal HSACK 37 is sent from the host controller in response thereto, the predetermined amount of data is written from the FIFO memory 4 into the host computer. Thereafter, since the predetermined amount of data is read out each time the signal HSACK 37 is generated, the counter 14 may decrement its contents, for example, by one each time the signal HSACK 37 is inputted thereto.

Depending on how much data is stored in the FIFO memories 4 and 5, the arbitration logic circuit 45 selects one from the buffer access request signals respectively having different priority on both host side and drive side such as HHREQ 22a (the host side has priority over the drive side), HLREQ 22b (the drive side has priority over the host side), DHREQ 26a (the drive side has priority over the host side), and DLREQ 26a (the host side has priority over the drive side).

In addition to the above buffer access requests, the arbitration logic circuit 45 arbitrates the buffer access request MREQ 24 by the microprocessor 1 and the buffer access request REFREQ 29 by the refresh counter for refreshing the buffer memory 11.

The arbitration is performed at a timing set by an arbitration acknowledge signal ARBITEN 46.

The signal 22 in FIG. 1 is indicated by the signals 22a and 22b in FIG. 2, and similarly, the signals 26, 23 and 27 in FIG. 1 are indicated by signals 26a and 26b; 23a and 23b; and 27a and 27b in FIG. 2.

FIG. 2 illustrates a case where a plurality of access requests concur, and higher priority is given to them in the order of MREQ24, DHREQ26a, REFREQ 29, HHREQ22A, DLREQ26b and HLREQ22b. In the figure, references #1 –#5 designate the priority. Incidentally, this priority order may be changed by the MPU 1 in accordance with data amounts indicated by the signals HFCNT 32 and SFCNT 34.

Figure 4A:
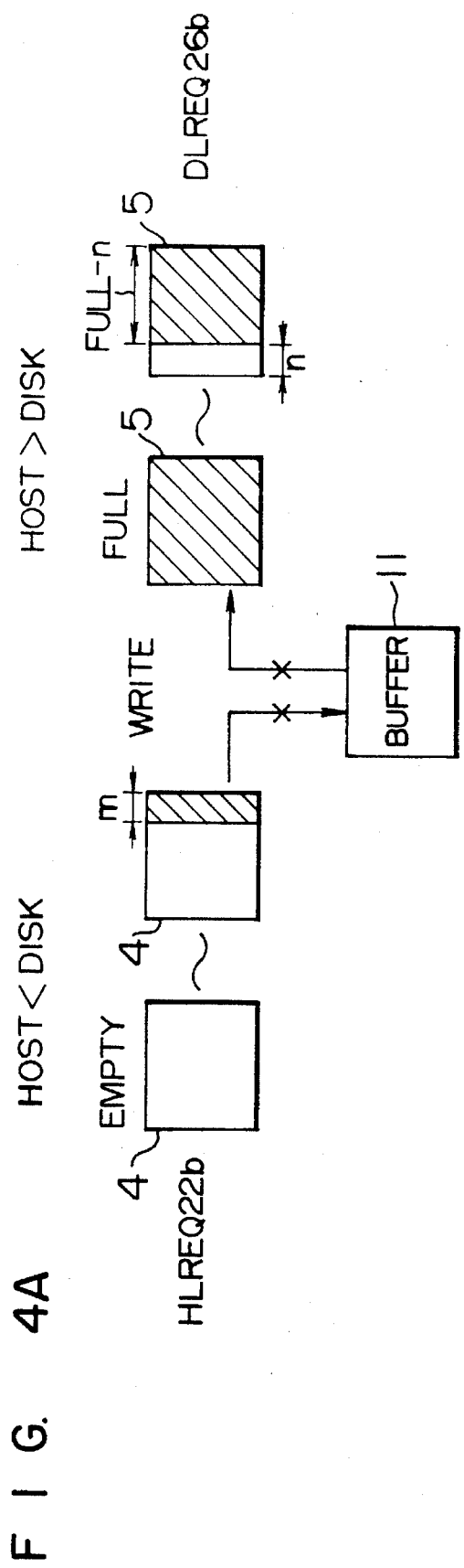
FIGS. 4A and 4B are diagrams illustrating examples of the relationship between states of a FIFO memory and the buffer access priority during a disk write in the data transfer control method according to one embodiment of the present invention.
Figure 4B:
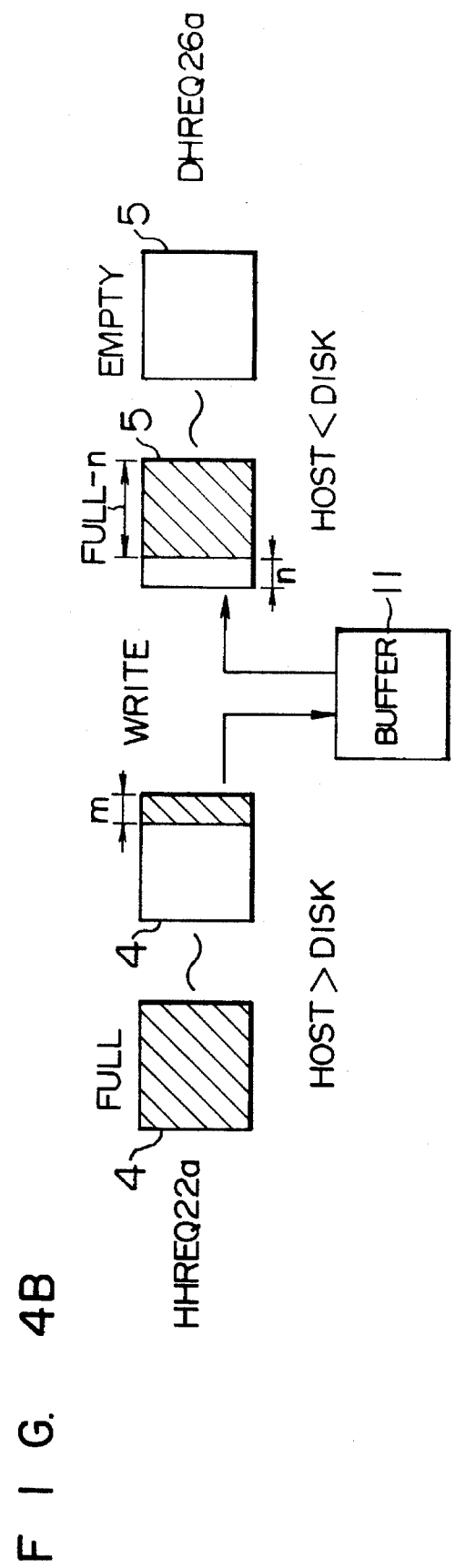

Next, FIGS. 3A and 3B illustrate examples of relationships between states of the FIFO memories 4 and 5 and the buffer access priority during a disk read, and FIGS. 4A and 4B those during a disk write.

In this embodiment, a particular example will be given where the host interface control circuit 2 makes an access in a page mode where one page is comprised of, for example, m bytes. As shown in FIG. 3B, when the FIFO memory 4 has a stored area in a range from EMPTY to (FULL minus m) (that is, when the logic signal 4a is ON, e.g., at "1") during a read, the FIFO memory 4 has an empty area of more than m bytes, from which a judgement can be made that data of more than one page may be transferred from the buffer memory 11 to the FIFO memory 4. Incidentally, the logic signal 4a becomes off, e.g., at "0" when the memory 4 has an empty area of less than m bytes.

On the contrary, as shown in FIG. 4B, when the , FIFO memory 4 has a stored area in a range of m bytes to FULL (that is, when the logic signal 4b is ON) during a write, more than m bytes of data have been transferred from the host computer to the FIFO memory 4, so that a judgement can be made that data can be written from the FIFO memory 4 to the buffer memory 11.

Assuming that the transfer request from the host side has higher priority (weight or importance) than that from the drive side in the above two cases, the signal HHREQ 22a is selected by the OR circuit 40 and supplied to the arbitration logic circuit 45 to request a buffer access.

On the other hand, as shown in FIG. 3A, when the FIFO memory 4 has a stored state in a range from FULL to (FULL minus m bytes) (that is, the logic signal 4c is ON) during a read, the FIFO memory 4 does not have an empty area of more than m bytes, so that a judgement can be made that one page portion of data cannot be transferred from the buffer memory 11 to the FIFO memory 4.

As shown in FIG. 4A, when the FIFO memory 4 has a stored area in a range from EMPTY to m bytes (that is, when the logic signal 4d is ON) during a write, an m-byte portion of data has not been transferred from the host to the FIFO memory 4, whereby a judgement can be made that data cannot be written from the FIFO memory 4 to the buffer memory 11.

Assuming that the transfer request from the host side has lower priority than that from the drive side in the above two cases, the signal HLREQ 22b is selected by the OR circuit 41 and supplied to the arbitration logic circuit 45.

Next, description will be made as to a case where the drive is accessed by the disk interface control circuit 3 in an n-byte page mode. As shown in FIG. 3B, when the FIFO memory 5 has a stored area in a range from n bytes to FULL (that is, when the logic signal 5a is ON) during a read, more than n bytes of data has been transferred from the drive, so that a judgement can be made that the data can be written into the buffer memory 11.

On the other hand, as shown in FIG. 4B, when the FIFO memory 5 has a stored area in a range from EMPTY to (FULL minus n bytes) (that is, the logic signal 5b is ON) during a write, the FIFO memory 5 has an empty area of more than n bytes, so that a judgement can be made that data can be transferred from the buffer memory 11.

Assuming that the transfer request from the drive side has higher priority than that from the host side in the above two cases, the signal DHREQ 26a is selected by the OR circuit 42 and supplied to the arbitration logic circuit 45 to request a buffer access.

On the other hand, as shown in FIG. 3A, when the FIFO memory 5 has a stored area in a range from EMPTY to n bytes (that is, when the logic signal 5c is ON) during a read, an n-byte portion of data has not been transferred from the drive to the FIFO memory 5, so that a judgement can be made that data cannot be written into the buffer memory 11.

As shown in FIG. 4A, when the FIFO memory 5 has a stored area in a range from (FULL minus n bytes) to FULL (that is, when the logic signal 5d is ON) during a write, the FIFO memory 5 does not have an empty area of n bytes, so that a judgement can be made that a transfer from the buffer memory 11 is impossible.

Assuming that the transfer request from the drive side has lower priority than that from the host side in the above two cases, the drive transfer request DLREQ 26b is selected by the OR circuit 43 and supplied to the arbitration logic circuit 45.

When at least two among the above signals HHREQ 22a, HLREQ 22b, DHREQ 26a, DLREQ 26b, HREQ 24, and REFREQ 29 concur, the arbitration logic circuit 45 determines the priority order thereof (weight of importance). In principle, the arbitration logic circuit 45 determines the priority order in the following manner. Specifically, when the signals HHREQ 22a and DLREQ 26b concur, the former is given the higher priority, when the signals HLREQ 22b and DHREQ 26a concur, the latter is given the higher priority. The arbitration logic circuit 45 may freely determine the priority order for other combinations of concurring signals except for this principle.

FIG. 5 illustrates an example of a timing of arbitration made to an access to the buffer memory 11.

In the charts, timings of the respective signals are based on a basic clock CLK 50.

This embodiment shows that the buffer memory 11 is accessed in a page mode where one page is comprised of four bytes.

If the transfer speed of the drive is faster than that of the host computer, a transfer is performed with the buffer memory 11 being full for a read while with the buffer memory 11 being substantially empty for a write.

In this event, the signal DHREQ 26a is ON, e.g., at "1" indicating that more than four bytes of data are stored in the FIFO memory 5, that is, at least one page portion of data is ready to be transferred, while the signal HLREQ 22b is ON indicating that more than (FULL minus 4 bytes) of data are stored in the FIFO memory 4, that is, there is an empty area of less than even one page portion.

Since the DHREQ 26a has priority over HLREQ 22b in this case, the arbitration logic circuit 45 returns DHACK 27a to the control circuit 3, whereby the drive is given the right of an access to the buffer memory 11.

A buffer access for transferring data between the buffer memory 11 and the drive is performed while the signal DHACK 27a is ON. In this embodiment, since the access is performed in the four-byte page mode, four consecutive column addresses 39a (COLUMN ADR) (col#0– col#3) are selected for one row address (ROW ADR).

Data is written into the buffer memory 11 at a timing of a buffer write signal 53 and read from the same at a timing of a buffer read signal BUFRD54.

The FIFO memory counter 15 increments or decrements its count in response to the signal 26, 27, 36 or 38 at a timing of a signal FIFOCNT 55.

After the last column address (COL#3) has been selected, the next buffer access right is selected at a timing of a signal ARBITEN 46. In this embodiment, since the signal HLREQ 22 has lower priority than the signal DHREQ 26a at a timing of the first basic clock CLK 50, HLREQ 22 has turned over the access right and is awaiting to be selected, and is selected by the access right arbitration at a timing of the 13th clock CLK 50, thereby outputting a signal HLACK 23b.

In the meantime, the data transfer progresses from the host computer to the FIFO memory 4 on the host side, whereby the signal HHREQ 22a can be thought to have become ON which has priority over the signal HLREQ 22b.

Figure 6:
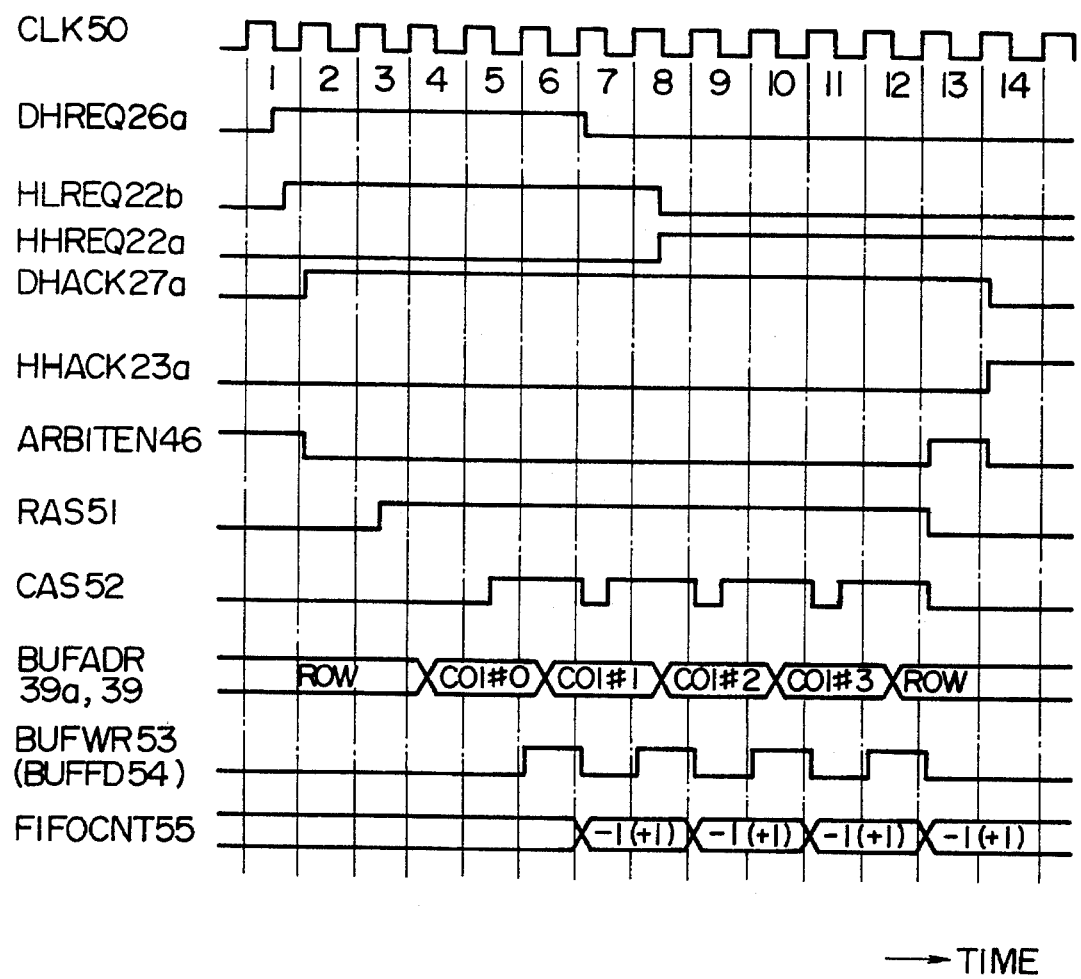
FIG. 6 is a timing chart illustrating an example of the operation of the data transfer control method according to one embodiment of the present invention.

In such a case, since the arbitration logic circuit 45 outputs the acknowledge signal HHACK 23b in response to the signal HHREQ 22a, there is no problem on transfer (see FIG. 6).

If a fraction amount of data, that is, an amount of data less than one page portion, not an integer multiple of the number of bytes comprised in one page determined as the basic unit of the data transfer amount, appears in the final transfer, the request signals DHREQ 26a and HHREQ 22a become OFF while DLREQ 26b and HLREQ 22b become ON.

In this event, for giving higher priority to the data processing for this fraction of data, signals HLAST 60 and DLAST 61 indicating that the fraction of data is finally transferred are logically ANDed with the signals HLREQ 22b and DLREQ 26b by the AND circuits 62 and 63, respectively, and the respective output signals are further logically ORed with the signals HHREQ 22a and DHREQ 26a by the OR circuits 64 and 65, respectively.

Figure 7:
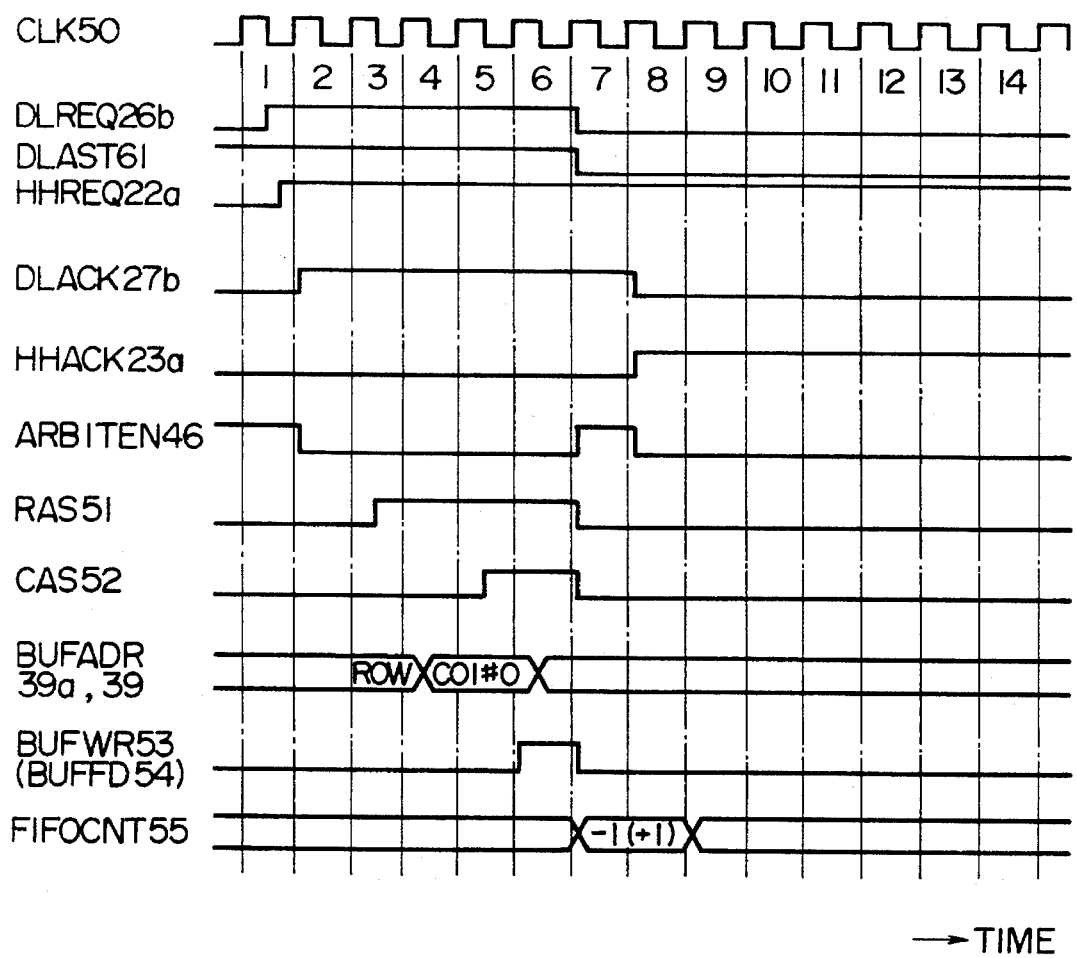
FIG. 7 is a timing chart illustrating an example of the operation of the data transfer control method according to one embodiment of the present invention.

FIG. 7 illustrates an example of a timing of a buffer access arbitration to the request signal DLREQ 26b for transferring the final one byte.

Although the signal DLREQ 26b itself has lower priority than the signal HHREQ 22a, since the signal DLASTR 61 is ON (e.g., at "1"), DLREQ 26b is regarded as having priority equal to that of the signal DHREQ 26a, an acknowledge signal DLACK 27a is returned to the control circuit 3, whereby the request signal DLREQ 26b acquires the buffer access right.

At the time when the first column address has been transferred, the buffer access is terminated, the signal DLACK 27b becomes OFF, and the signal ARBITEN 46 for the next buffer access right becomes ON.

Thus, the transfer is possible even when data is less than the one-page portion.

Although in the foregoing embodiment, the buffer access is performed in a four-byte page mode in both upper and lower sides, an alternative system may be thought which allows a selection of the page mode between four bytes and 16 bytes as well as a selection of the buffer memory 11 (DRAM) between 256 kbytes and 1 Mbytes by providing a table as shown in FIG. 8.

Also, the reference data amounts of the FIFO memory 4 and 5 for determining the priority order of the buffer accesses, that is, m bytes on the host side and the n bytes on the peripheral side may be set to an integer fraction of the capacity of the FIFO memory 4 or 5 or a number of absolute bytes in place of the page access amount of the buffer memory 11.

In the configuration of this embodiment, parts of the FIFO memories 4 and 5 may be composed of plural plane buffers, and the buffer memory 11 may be constituted of static random access memories (SRAM) in place of DRAMs.

Next, description will be made as to a refresh operation performed by the refresh counter 9 to the buffer memory 11. The refresh counter 9 generally counts a clock signal of a constant period, not shown, and when its counted value reaches a predetermined value, it supplies the arbitration circuit 8 with the buffer access request signal REFREQ 29 for requiring to refresh the buffer memory 11. The arbitration circuit 8, in response to this request, supplies the acknowledge signal REFACK 28 to the counter 9 which responsively supplies a byte address REFADR 30 to the address selection circuit 10, and resets the counted value. The buffer memory 11 is thus refreshed.

The counted value of the refresh counter 9 is reset also by, for example, the acknowledge signal DACK 27 supplied to a reset terminal RST thereof. Stated another way, when a data read or write is performed to the FIFO memory 5 by the acknowledge signal DACK 27, that is, when a disk read or write operation is performed, the counter 9 is reset. This is because a predetermined amount of data is sequentially written into or read from the buffer memory 11 together with a disk read or write processing, which corresponds to a refresh operation. Here, a read or write operation of a peripheral storage, for example, a magnetic disk drive unit is executed by at least one sector (generally 512 bytes) portion at a constant speed corresponding to a normal rotation of the magnetic disk drive unit.

Therefore, if a cycle of this read or write operation is shorter than a refresh cycle, the read or write operation can substitute for the refresh operation.

Generally speaking, when a magnetic disk or a recording medium is accessed in a magnetic disk drive unit, at least one sector is sequentially processed so that a data transfer speed, in the meantime, is determined to be a constant burst speed corresponding to a rotational speed of the magnetic disk drive unit.

Giving as an example a magnetic disk drive manufactured by the assignee of the present application, one sector or 512 bytes of data are transferred at a speed of 3 Mbytes/second, and therefore, addresses of nine bits are accessed in 170 μs.

However, since a look ahead cache actually operates even if the access is a single command for accessing a sector and a relatively long time period intervenes until the next command is executed, one segment portion of a buffer area (48 Kbytes ≧ 15 bits in the case of the foregoing magnetic disk drive unit) is accessed.

Actually, since overhead of several milliseconds of the magnetic disk drive unit or the host computer occurs each time a command is executed, even if accesses of a minimum data length are repeated at minimum intervals in a magnetic disk drive unit which is not provided with the look ahead cache, DRAMs constituting a main buffer memory can be refreshed by using actually transferred data during the overhead period.

In this embodiment as described above, attention was paid to the fact that a read or write processing of a peripheral storage such as a magnetic disk drive unit is performed with at least one sector (generally 512 bytes) portion of data at a constant speed corresponding to a normal rotation of the magnetic disk drive unit. Specifically, in consideration of addresses of a main buffer memory to be accessed, DRAMs constituting the main buffer memory can be refreshed by using data actually transferred between a host and a peripheral storage during a read or write operation therebetween, and the refresh counter is therefore reset. Incidentally, requests having higher priority during the above processing are assumed to have priority over the refresh request.

Specifically, when an access request has been issued by the host or the peripheral storage prior to a refresh request from the DRAM refresh counter, that is, when an access request has been issued to transfer more than a predetermined amount of data which is sufficient to substitute for refreshing the DRAMs, the arbitration logic circuit 45 resets the refresh counter 9 and has the data transfer substitute for the refresh operation by the access from the host or the peripheral storage, thereby minimizing the frequency of accesses to the DRAMs due to refresh requests.

Figure 9:
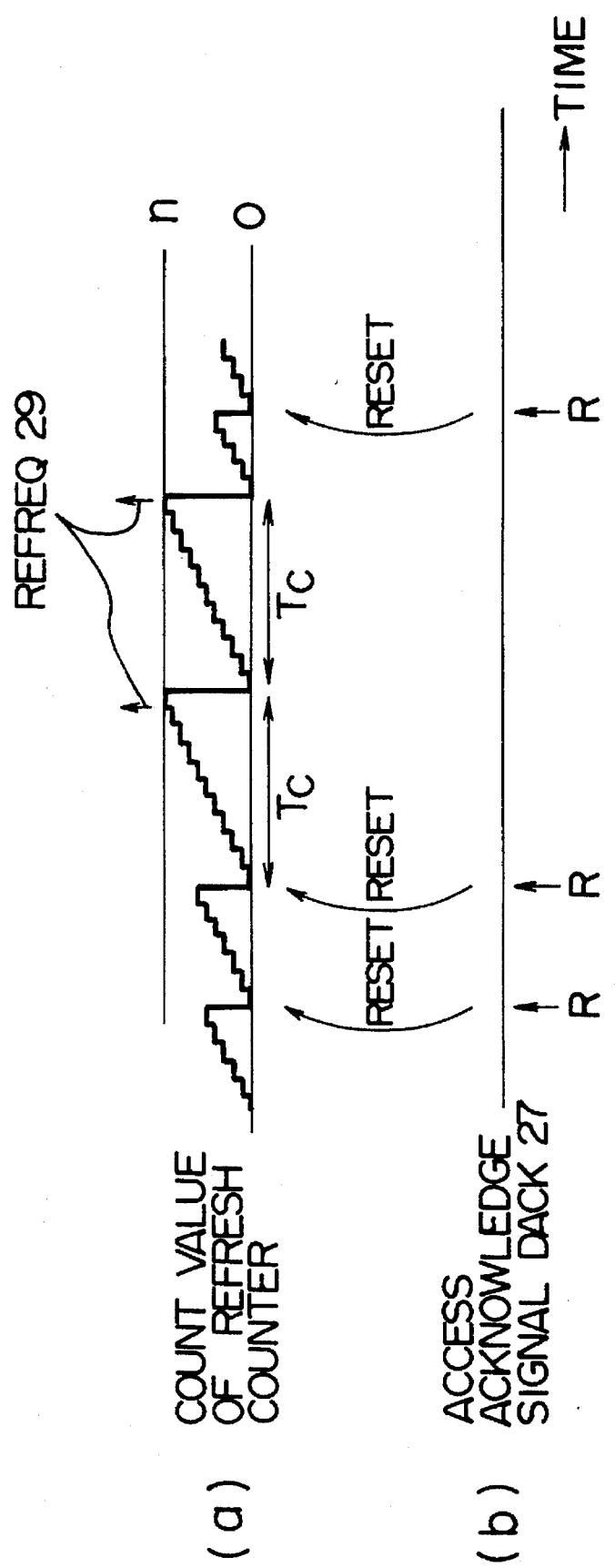
FIG. 9 is a timing chart used for explaining a refresh operation in the data transfer control method according to one embodiment of the present invention.

For example, when the arbitration circuit 8 outputs the access acknowledge signal DACK 27 in response to an access request (the generation of the access acknowledge signal is indicated by R in (b) of FIG. 9, as shown in (b) of FIG. 9, the counter 9 is reset by this access acknowledge signal, while an operation equivalent to the refresh is performed by an access to the buffer memory by the access request. However, if the access acknowledge signal DACK 27 is not outputted thereafter for a predetermined time period (indicated by Tc in (a) of FIG. 9), the counted value of the counter 9 will reach a predetermined value (e.g., "n") and the refresh request REFREQ 29 is outputted, resulting in refreshing the buffer memory.

Although in the foregoing embodiment, a FIFO memory (prefetching buffer) is disposed on both sides of the interface control circuits 2 and 3, it may be disposed on either of the two sides. In this case, the processing may be executed similarly to the above embodiment, supposing that the interface control circuit without a FIFO memory has a FIFO memory of zero capacity. Stated another way, since the supposed FIFO memory has zero capacity, the processing is executed on the assumption that data is fully stored therein during a write and no data is stored therein during a read.

As described above, according to the data transfer control method and apparatus of the present embodiment, the following effects can be produced in accesses to a standard drive:

(1) when the buffer memory 11 constituted of DRAMs or the like is accessed in the page mode, by giving higher priority to the case where one page portion of data is stored in the FIFO memories 4 and 5 or an empty area of one page portion exists in the FIFO memories 4 and 5, both host and peripheral devices can operate in an efficiently time-divided page mode, so that cheap and large capacity DRAMs may be utilized for the buffer memory 11 for a magnetic disk drive unit which is required a high speed access.

(2) In the present situation, a buffer access from the drive side can substitute for a refresh required to DRAMs generally used for configuring the buffer memory 11, which results in reducing the frequency of interrupting data transfer due to refresh and improving the data transfer efficiency through the buffer memory 11.

Within the inventions disclosed by the present application, effects produced by typical ones may be summarized as follows:

According to the data transfer control method and apparatus of the present invention, the efficiency of data transfer through a buffer memory interposed between a host and a peripheral device (input/output device) can be improved without being influenced by the difference in data transfer speed therebetween.

It is also possible to accomplish the configuration of a buffer memory in a low cost as well as an increase in the capacity thereof and the data transfer efficiency.

Incidentally, although a magnetic disk drive unit is employed as a peripheral device in the foregoing embodiment, the peripheral device may be a scanner capable of transferring a certain amount of data at a time, a magnetic tape drive unit, or an input/output device.

We claim:

1. A data transfer control apparatus for communicating data between a host device and an input/output device through a main buffer memory for temporarily holding the data, comprising:

a) a first sub-buffer memory for temporarily storing the data and being disposed between said main buffer memory and a faster device in data transfer speed, which is either said host device or said input/output device;

b) a first detector having means for detecting a quantity of data stored in said first sub-buffer memory and having means for outputting a first access request in accordance with the quantity of data detected as compared to a quantity of data transferred in a single data transfer between said faster device and said main buffer memory in response to the first access request;

c) a second sub-buffer memory for temporarily storing the data and being disposed between said main buffer memory and a remaining device, which is either said host device or said input/output device;

d) a second detector having means for detecting a quantity of data stored in said second sub-buffer memory and having means for outputting a second access request in accordance with the quantity of data detected as compared to a quantity of data transferred in a single data transfer between said remaining device and said main buffer memory in response to the second access request;

e) a processor selecting one of said access requests as to said main buffer memory in accordance with a priority order to access said main buffer memory based on the access request selected;

f) means for providing a refresh request for refreshing said main buffer memory to said processor at predetermined intervals, wherein said processor further comprises means for using an accessing of said main buffer memory to refresh the main buffer memory in response to one of the access requests as a substitute for refreshing the main buffer memory based on the refresh request from said refresh request means when the access request exists for transferring data equal to or larger than a predetermined quantity of data prior to the refresh request being output by said means for providing a refresh request;

g) means for dynamically changing said priority order of said access requests in accordance with said quantity of data detected in said sub-buffer memories:

h) means for outputting a third access request for transferring data between said main buffer memory and said first sub-buffer memory when an empty area in said first sub-buffer memory is equal to or larger than a quantity of data read into said first sub-buffer memory during a single data transfer;

i) means for outputting a fourth access request for transferring data between said main buffer memory and said second sub-buffer memory when an empty area in said second sub-buffer memory is less than the quantity of data read into said second sub-buffer memory during a single data transfer; and j) means for setting a priority of said third access request higher than a priority of said fourth access request.

2. The data transfer control apparatus according to claim 1, wherein:

a) said means for providing a refresh request is a refresh counter adapted to count at predetermined intervals and output said refresh request when the counted value thereof reaches a predetermined value; and b) said processor includes means for resetting said refresh counter, when one of the access requests has been issued for transferring data equal to or larger than a predetermined quantity of data prior to the refresh request being output by said means for providing a refresh request, in response to one of said access requests.

3. A data transfer control apparatus for communicating data between a host device and an input/output device through a main buffer memory for temporarily holding the data, comprising:

a) a first sub-buffer memory for temporarily storing the data and being disposed between said main buffer memory and a faster device in data transfer speed, which is either said host device or said input/output device;

b) a first detector having means for detecting a quantity of data stored in said first sub-buffer memory and having means for outputting a first access request in accordance with the quantity of data detected compared to a quantity of data transferred in a single data transfer between said faster device and said main buffer memory in response to the first access request;

c) a second sub-buffer memory for temporarily storing the data and being disposed between said main buffer memory and a remaining device, which is either said host device or said input/output device;

d) a second detector having means for detecting a quantity of data stored in said second sub-buffer memory and having means for outputting a second access request in accordance with the quantity of data detected as compared to a quantity of data transferred in a single data transfer between said remaining device and said main buffer memory in response to the second access request;

e) a processor selecting one of said access requests as to said main buffer memory in accordance with a magnitude of a predetermined weight to access said main buffer memory on the basis of said access request selected; and f) means for providing a refresh request for refreshing said main buffer memory to said processor at predetermined intervals, wherein said processor further comprises means for using an accessing of said main buffer memory to refresh the main buffer memory in response to one of the access requests as a substitute, for refreshing the main buffer memory based on the refresh request from said refresh request means when the access request exists for transferring data equal to or larger than a predetermined quantity of data prior to the refresh request being output by said means for providing a refresh request;

g) means for dynamically changing the magnitude of weights given to said access requests in accordance with said quantity of data detected in said sub-buffer memories;

h) means for outputting a third access request for transferring data between said main buffer memory and said first sub-buffer memory when an empty area in said first sub-buffer memory is equal to or larger than a quantity of data read into said first sub-buffer memory during a single data transfer:

i) means for outputting a fourth access request for transferring data between said main buffer memory and said second sub-buffer memory when an empty area is said second sub-buffer memory is less than the quantity of data read into said second sub-buffer memory during a single data transfer; and j) means for setting a magnitude of predetermined weight of said third, access request higher than a magnitude of predetermined weight of said fourth access request.

4. A data transfer control apparatus for communicating data between a host device and a magnetic disk drive unit through a main buffer memory for temporarily holding the data, comprising:

a) a first sub-buffer memory for temporarily storing the data being disposed between said main buffer memory and a faster device in data transfer speed, which is either said host device or said magnetic disk drive unit;

b) a first detector having means for detecting a quantity of data stored in said first sub-buffer memory and having means for outputting a first access request in accordance with the quantity of data detected as compared to a quantity of data transferred in a single data transfer between said faster device and said main buffer memory in response to the first access request;

c) a second sub-buffer memory for temporarily storing the data and being disposed between said main buffer memory and a remaining device, which is either said host device or said magnetic disk drive unit;

d) a second detector having means for detecting a quantity of data stored in said second sub-buffer memory and having means for outputting a second access request in accordance with the quantity of data detected as compared to a quantity of data transferred in a single data transfer between said remaining device and said main buffer memory in response to the second access request;

e) a processor selecting one of said access requests as to said main buffer memory in accordance with a priority order to access said main buffer memory based on the access request selected;

d) means for providing a refresh request for refreshing said main buffer memory to said processor at predetermined intervals wherein said processor further comprises means for using an accessing or said main buffer memory to refresh the main buffer memory in response to one of the access requests as a substitute for refreshing the main buffer memory based on the refresh request from said refresh request means when the access request exists for transferring data equal to or larger than a predetermined quantity of data prior to the refresh request being output by said means for providing a refresh request;

g) means for dynamically changing said priority order of said access requests in accordance with said quantity of data detected in said sub-buffer memories;

h) means for outputting a third access request for transferring data between said main buffer memory and said first sub-buffer memory when an empty area in said first sub-buffer memory is equal to or larger than a quantity of data read into said first sub-buffer memory during a single data transfer;

i) means for outputting a fourth access request for transferring data between said main buffer memory and said second sub-buffer memory when an empty area in said second sub-buffer memory is less than the quantity of data read into said second sub-buffer memory during a single data transfer; and j) means for setting a priority of said third access request higher than a priority of said fourth access request.

5. A data transfer control method for communicating data between a host device and an input/output device through a main buffer memory for temporarily holding the data, comprising the steps of:

a) temporarily holding the data in a first sub-buffer memory disposed between said main buffer memory and a faster device in data transfer speed, which is either said host device or said input/output device;

b) detecting a quantity of data stored in said first sub-buffer memory;

c) outputting a first access request in accordance with the quantity of data detected as compared to a quantity of data transferred in a single data transfer between said faster device and said main buffer memory in response to the first access request;

d) temporarily holding the data in a second sub-buffer memory disposed between said main buffer memory and a remaining device, which is either said host device or said input/output device;

e) detecting a quantity of data stored in said second sub-buffer memory;

f) outputting a second access request in accordance with the quantity of data detected as compared to a quantity of data transferred in a single data transfer between said remaining device and said main buffer memory in response to the second access request;

g) selecting one of said access requests to said main buffer memory in accordance with a priority order to access said main buffer memory based on the access request selected;

h) outputting a refresh request for refreshing said main buffer memory at predetermined intervals, wherein said step g of selecting further comprises the step of accessing said main buffer memory to refresh said main buffer memory, when one of said access requests exists for transferring data equal to or larger than a predetermined quantity of data at a timing prior to providing the refresh request, in response to one of said access requests in place of said refresh request;

where, in said step c) of outputting a first access request further comprises:

i) dynamically changing said priority order of said access requests in accordance with said quantity of data detected;

j) outputting a third access request for transferring data between said first sub-buffer memory and said main buffer memory when a quantity of data stored in said first sub-buffer memory is equal to or more than a quantity of data read into said first sub-buffer memory during a single data transfer;

k) outputting a fourth access request for transferring data between, said second sub-buffer memory and said main buffer memory when a quantity of data stored in said second sub-buffer memory is less than the quantity of data read into said second sub-buffer memory during a single data transfer; and l) setting a priority of said third access request higher than a priority of said fourth access request.

6. The data transfer control method according to claim 5, wherein:

said step h of outputting a refresh request further comprises the step of counting at predetermined intervals by using a refresh counter and outputting said refresh request when the counted value reaches a predetermined value; and said step g of selecting further comprises the step of resetting said refresh counter, when an access request has been issued for transferring data equal to or larger than a predetermined quantity of data at a timing prior to said refresh request provided by said refresh counter, in response to said access request.

7. A data transfer control method for communicating data between a host device and an input/output device through a main buffer memory for temporarily holding the data, comprising the steps of:

a) temporarily holding the data in a first sub-buffer memory disposed between said main buffer memory and a faster device in data transfer speed, which is either said host device or said input/output device;

b) detecting a quantity of data stored in said first sub-buffer memory;

g c) outputting a first access request in accordance with the quantity of data detected as compared to a quantity of data transferred in a single data transfer between said faster device and said main buffer memory in response to the first access request;

d) temporarily holding the data in a second sub-buffer memory disposed between said main buffer memory and a remaining device, which is either said host device or said input/output device;

e) detecting a quantity of data stored in said second sub-buffer memory;

f) outputting a second access request in accordance with the quantity of data detected as compared to a quantity of data transferred in a single data transfer between said remaining device and said main buffer memory in response to the second access request;

g) selecting one of said access requests to said main buffer memory in accordance with a magnitude of a predetermined weight to access said main buffer memory based on the access request selected;

h) outputting a refresh request for refreshing said main buffer memory at predetermined intervals, wherein said step g of selecting further comprises the step of accessing said main buffer memory to refresh said main buffer memory, when one of said access requests exists for transferring data equal to or larger than a predetermined quantity of data at a timing prior to providing a refresh request, in response to one of said access requests in place of said refresh request;

wherein said step c) of outputting a first access request further comprises:

i) dynamically changing the magnitude of weights given to said access requests in accordance with said quantity of data detected;

ii) outputting a third access request for transferring data between said first sub-buffer memory and said main buffer memory when a quantity of data stored in said first sub-buffer memory is equal to or more than a quantity of data stored in said first sub-buffer memory during a single data transfer;

k) outputting a fourth access request for transferring data between said second sub-buffer memory and said main buffer memory when a quantity of data stored in said second sub-buffer memory is less than the quantity of data read into said second sub-buffer memory during a single data transfer; and l) setting weight of said third access request higher than a weight of said fourth access request.

8. A data transfer control method for communicating data between a host device and a magnetic disk drive unit through a main buffer memory for temporarily holding the data, comprising the steps of:

a) temporarily holding the data in a first sub-buffer memory disposed between said main buffer memory and a faster device in data transfer speed, which is either said host device or said magnetic disk drive unit;

b) detecting a quantity data stored in said first sub-buffer memory;

c) outputting a first access request in accordance with the quantity of data detected as compared to a quantity of data transferred in a single data transfer between said faster device and said main buffer memory in response to the first access request;

d) temporarily holding the data in a second sub-buffer memory disposed between said main buffer memory and a remaining device which is either said host device or said magnetic disk drive unit;

e) detecting a quantity of data stored in said second sub-buffer memory;

f) outputting a second access request in accordance with the quantity of data detected as compared to a quantity of data transferred in a single data transfer between said remaining device and said main buffer memory in response to the second access request;

g) selecting one of said access requests to said main buffer memory in accordance with a priority order to access said main buffer memory based on the access request selected;

h) outputting a refresh request for refreshing said main buffer memory at predetermined intervals, wherein said step g of selecting further comprises the step of accessing said main buffer memory to refresh said main buffer memory, when one of said access requests exists for transferring data equal to or larger than a predetermined quantity of data at a timing prior to providing the refresh request, in response to one of said access requests in place of said refresh request;

wherein said step c) of outputting a first access request further comprises:

i) dynamically changing said priority order of said access requests in accordance with said quantity of data detected;

j) outputting a third access request for transferring data between said first sub-buffer memory and said main buffer memory when a quantity of data stored in said first sub-buffer memory is equal to or more than a quantity of data stored in said first sub-buffer memory during a single data transfer;

k) outputting a fourth access request for transferring data between said second sub-buffer memory and said main buffer memory when a quantity of data stored in said second sub-buffer memory is less than the quantity of data read into said second sub-buffer memory during a single data transfer; and l) setting a priority of said third access request higher than a priority of said fourth access request.

9. A data transfer control apparatus for communicating data between a host device and an input/output device through a main buffer memory for temporarily holding the data, comprising:

a) a first sub-buffer memory for temporarily storing the data and being disposed between said main buffer memory and a faster device, which is either said host device or said input/output device;

b) a first detector having means for detecting a quantity of data stored in said first sub-buffer memory and having means for outputting a first access request in accordance with the quantity of data detected as compared to a quantity of data transferred in a single data transfer between said faster device and said main buffer memory in response to the first access request;

c) a second sub-buffer memory for temporarily storing the data and being disposed between said main buffer memory and a remaining device, which is either said host device or said input/output device;

d) a second detector having means for detecting a quantity of data stored in said second sub-buffer memory and having means for outputting a second access request in accordance with the quantity of data detected as compared to a quantity of data transferred in a single data transfer between said remaining device and said main buffer memory in response to the second access request;

e) a processor selecting one of said access requests as to said main buffer memory in accordance with a priority order to access said main buffer memory based on the access request selected;

f) means for providing a refresh request for refreshing said main buffer memory to said processor at predetermined intervals, wherein said processor further comprises means for using an accessing of said main buffer memory to refresh the main buffer memory in response to one of the access requests as a substitute for refreshing the main buffer memory based on the refresh request from said refresh request means when the access request exists for transferring data equal to or larger than a predetermined quantity of data prior to the refresh request being output by said means for providing a refresh request;

g) means for dynamically changing said priority order of said access requests in accordance with said quantity of data detected in said sub-buffer memories;

h) means for outputting a third access request for transferring data between said main buffer memory and said first sub-buffer memory when an empty area in said first sub-buffer memory is equal to or larger than a quantity of data read into said first sub-buffer memory during a single data transfer;

i) means for outputting a fourth access request for transferring data between said main buffer memory and said second sub-buffer memory when an empty area in said second sub-buffer memory is less than the quantity of data read into said second sub-buffer memory during a single data transfer; and j) means for setting a priority of said third access request higher than a priority of said fourth access request.

10. The data transfer control apparatus according to claim 9, wherein:

a) said means for providing a refresh request is a refresh counter adapted to count at predetermined intervals and output said refresh request when the counted value thereof reaches a predetermined value; and b) said processor includes means for resetting said refresh counter, when one of the access requests has been issued for transferring data equal to or larger than a predetermined quantity of data prior to the refresh request being output by said means for providing a refresh request, in response to one of said access requests.

11. A data transfer control method for communicating data between a host device and magnetic disk drive unit through a main buffer memory for temporarily holding the data, comprising the steps of:

a) temporarily storing said data in a first sub-buffer memory disposed between said main buffer memory and a faster device in data transfer speed, which is either said host device or said magnetic disk drive unit;

b) detecting a quantity of data stored in said first sub-buffer memory;

c) outputting a first access request in accordance with the quantity of data detected as compared to a quantity of data transferred in a single data transfer between said faster device and said main buffer memory in response to the first access request;

d) temporarily storing the data in a second sub-buffer memory for disposed between said main buffer memory and a remaining device, which is either said host device or said magnetic disk drive unit;

e) detecting a quantity of data stored in said second sub-buffer memory;

f) outputting a second access request in accordance with the quantity of data detected as compared to a quantity of data transferred in a single data transfer between said remaining device and said main buffer memory in response to the second access request;

g) selecting one of said access requests to said main buffer memory in accordance with a magnitude of a predetermined weight to access said main buffer memory on the basis of said access request selected;

h) providing a refresh request for refreshing said main buffer memory at predetermined intervals, wherein said step g) of selecting further comprises the step of accessing said main buffer memory to refresh the main buffer memory, when one of said access requests exists for transferring data equal to or larger than a predetermined quantity of data prior to providing the refresh request, in response to one of said access requests in place of said refresh request;

wherein said step c) of outputting a first access request further comprises:

i) dynamically changing said magnitude of weights iron to said access requests in accordance with said quantity of data detected:

j) outputting a third access request for transferring data between said first sub-buffer memory and said main buffer memory when a quantity of data stored in said first sub-buffer memory is equal to or larger than a quantity of data read into said first sub-buffer memory during a single data transfer;

k) outputting a fourth access request for transferring data between said main buffer memory and said second sub-buffer memory when a quantity of data stored in said second sub-buffer memory is less than the quantity of data read into said second sub-buffer memory during a single data transfer; and j) setting a magnitude of the weight given to said third access request higher than a magnitude of weight given to said fourth access request.

12. A data transfer control apparatus for communicating data between a host device and a magnetic disk drive unit through a main buffer memory for temporarily holding the data, comprising:

a) a first sub-buffer memory for temporarily storing said data and being disposed between a faster device, which is either said host device or said magnetic disk drive unit;

b) a first detector having means for detecting a quantity of data stored in said first sub-buffer memory and having means for outputting a first access request in accordance with the quantity of data detected as compared to a quantity of data transferred in a single data transfer between said faster device and said main buffer memory in response to the first access request;

c) a second sub-buffer memory for temporarily storing the data and being disposed between said main buffer memory and a remaining device, which is either said host device or said magnetic disk drive unit;

d) a second detector having means for detecting a quantity of data stored in said second sub-buffer memory and having means for outputting a second access request in accordance with the quantity of data detected as compared to a quantity of data transferred in a single data transfer between said remaining device and said main buffer memory in response to the second access request;

e) a processor selecting one of said access requests as to said main buffer memory in accordance with a magnitude of a predetermined weight to access said main buffer memory based on the access request selected;

f) means for providing a refresh request for refreshing said main buffer memory to said processor at predetermined intervals, wherein said processor further comprises means for using an accessing of said main buffer memory to refresh the main buffer memory in response to one of the access requests as a substitute for refreshing the main buffer memory based on the refresh request from said refresh request means when the access request exists for transferring data equal to or larger than a predetermined quantity of data prior to the refresh request being output by said means for providing a refresh request;

g) means for dynamically changing said magnitude of weights given to said access requests in accordance with said quantity of data detected in said sub-buffer memories;

h) means for outputting a third access request for transferring data between said main buffer memory and said first sub-buffer memory when an empty area in said first sub-buffer memory is equal to or larger than a quantity of data read into said first sub-buffer memory during a single data transfer;

i) means for outputting a fourth access request for transferring data between said main buffer memory and said second sub-buffer memory when an empty area in said second sub-buffer memory is less than the quantity of data read into said second sub-buffer memory during a single data transfer; and j) means for setting a magnitude of predetermined weight of said third access request larger than a magnitude of predetermined weight of said fourth access request.

13. A data transfer control apparatus for communicating data between a host device and an input/output device through a main buffer memory for temporarily holding the data, comprising:

a) a first sub-buffer memory for temporarily storing the data and being disposed between said main buffer memory and a faster device, which is either said host device or said input/output device;

b) a first detector detecting a quantity of data stored in said first sub-buffer memory:

c) a first access request generator for outputting a first access request in accordance with the quantity of data detected as compared to a quantity of data transferred in a single data transfer between said faster device and said main buffer memory in response to the first access request;

d) a processor selecting one of said access requests as to said main buffer memory in accordance with a priority order to access said main buffer memory based on the access request selected;

e) means for providing a refresh request for refreshing said main buffer memory to said processor at predetermined intervals, wherein said processor further comprises means for using an accessing of said main buffer memory to refresh the main buffer memory in response to one of the access requests as a substitute for refreshing the main buffer memory based on the refresh request from said refresh request means when the access request exists for transferring data equal to or larger than a predetermined quantity of data prior to the refresh request being output by said means for providing a refresh request;

f) a second sub-buffer memory for temporarily storing the data and being disposed between the main buffer and a remaining device, which is either said host device or the input/output device;

g) a second detector detecting a quantity of data stored in the second sub-buffer memory;

h) a second access request generator for outputting a second access request in accordance with the quantity of data detected by the second detector;

i) means for dynamically changing said priority order of said access requests in accordance with said quantity of data detected in said sub-buffer memories;

h) means for outputting a third access request for transferring data between said main buffer memory and said first sub-buffer memory when an empty area in said first sub-buffer memory is equal to or larger than a quantity of data read into said first sub-buffer memory during a single data transfer;

i) means for outputting a fourth access request for transferring data between said main buffer memory and said second sub-buffer memory when an empty area in said second sub-buffer memory is less than the quantity of data read into said second sub-buffer memory during a single data transfer; and j) means for setting a priority of said third access request higher than a priority of said fourth access request.

* * * * *

UNITED STATES PATENT AND TRADEMARK OFFICE
CERTIFICATE OF CORRECTION

PATENT NO. : 5,507,005
DATED     : April 9, 1996
INVENTOR(S) : Akira KOJIMA et al.

It is certified that error appears in the above-identified patent and that said Letters Patent is hereby corrected as shown below:

| Column | Line | |
|--------|------|---|
| 1  | 24 | Change "provided" to --composed--. |
| 3  | 2  | After "transferring" insert --data--. |
| 3  | 32 | Delete "being". |
| 3  | 36 | Change "operates" to --operate--. |
| 11 | 27 | Change "thought" to --used--. |
| 11 | 50 | Change "for requiring" to --required--. |
| 13 | 21 | Delete "is". |
| 13 | 22 | Change "required" to --requires--. |
| 13 | 39 | After "memory" change "in" to --at--. |
| 15 | 29 | After "substitute" delete ",". |
| 15 | 48 | After "area" change "is" to --in--. |

UNITED STATES PATENT AND TRADEMARK OFFICE
CERTIFICATE OF CORRECTION

PATENT NO. : 5,507,005
DATED : April 9, 1996
INVENTOR(S) : Akira KOJIMA et al.

It is certified that error appears in the above-indentified patent and that said Letters Patent is hereby corrected as shown below:

| Column | Line | |
|---|---|---|
| 16 | 23 | After "accessing" change "or" to --of--. |
| 17 | 35 | After "between" delete ",". |
| 20 | 49 | Before "magnetic" insert --a--. |
| 20 | 65 | After "memory" delete "for". |
| 21 | 24 | Change "iron" to --given--. |

Signed and Sealed this

Eighteenth Day of March, 1997

Attest:

BRUCE LEHMAN

Attesting Officer

Commissioner of Patents and Trademarks